March 8, 1966 M. M. MAZURSKY 3,239,018
COMBINATION EXAMINING TABLE AND SCALE
Filed Oct. 23, 1964 2 Sheets-Sheet 1

INVENTOR.
MILTON M. MAZURSKY
BY
Kimmel & Crowell
ATTORNEYS.

March 8, 1966  M. M. MAZURSKY  3,239,018
COMBINATION EXAMINING TABLE AND SCALE
Filed Oct. 23, 1964  2 Sheets-Sheet 2

INVENTOR.
MILTON M. MAZURSKY
BY Kimmel & Crowell
ATTORNEYS.

United States Patent Office 3,239,018
Patented Mar. 8, 1966

3,239,018
COMBINATION EXAMINING TABLE AND SCALE
Milton M. Mazursky, 215 Westward Drive,
Miami Springs, Fla.
Filed Oct. 23, 1964, Ser. No. 406,035
5 Claims. (Cl. 177—144)

The present invention relates to an examining table for use by a pediatrician or any physician with infants and children as patients in offices, hospitals, and public clinics, and in particular to a means for releasable locking the examining table in the examining position, the table being combined with a scale for weighing an infant or child being examined.

Presently in use in doctors' offices, hospitals, and clinics are combination tables and scales on which infants and children are examined and weighed. A chief defect in such a table is that when in the examining condition the surface of the table on which the child or infant is placed is insecure and is inclined to wobble under the weight of the infant or child which normally twists, turns, kicks, and otherwise engages in physical activity. This undesirable wobble is due to faulty construction of the mechanism which shifts the table top from the weighing position to the examining position and, with wear, such wobble of the table top increases.

Other defects of such tables now available are that the tables cannot accommodate children over three or four years of age for examining purposes, and if the tables do lock well so that juggling is eliminated, the locking devices are either so complicated or the time consumed in locking such a table so long that the table is not practical for office use.

Such a table top when in the examining position and under the weight and activity of an infant or child gives rise to nervousness and distraction in the infant or child and makes it difficult for the physician to properly examine the infant or child.

Therefore, the primary object of the present invention is to provide, in a physician's examining table and scale, latch means which holds the examining table top against movement under the weight and activity of an infant or child being examined, such latch means being easily and with facility unlatched for movement of the table top from the examining position to the weighing position.

Another object of the present invention is to provide a combination physician's examining table top and scale in which the table top when in the examining position has no movement whatsoever, but one which is readily shifted from the examining position to the weighing position with little physical effort.

A further object of the present invention is the provision of a combination examining table and scale for a physican which is sturdy in construction, one simple in structure, and one economically feasible.

These and other objects and advantages of the present invention will be fully apparent from the following description when taken in connection with the annexed drawings, in which.

Figure 1:
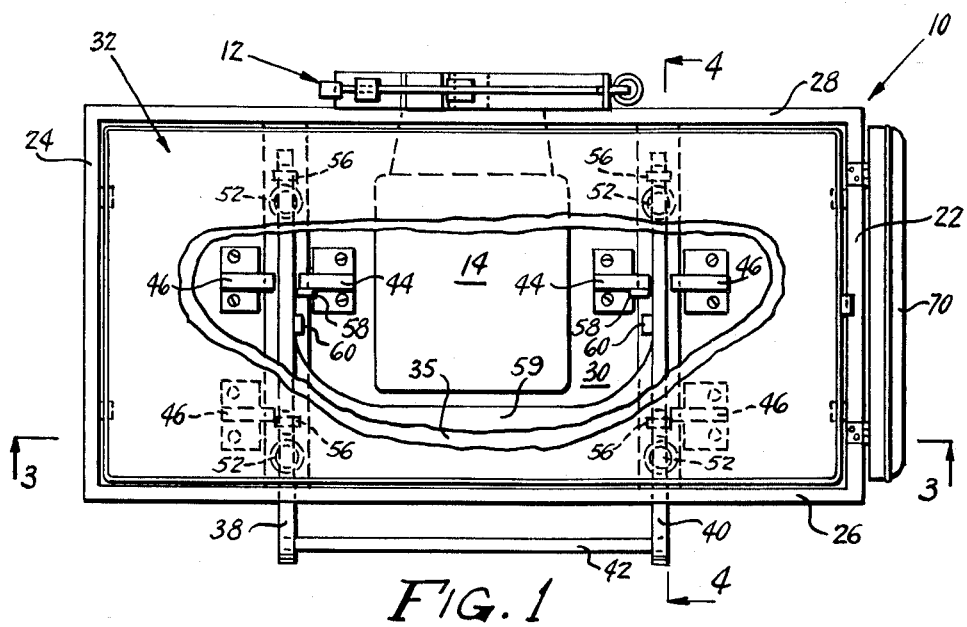
FIGURE 1 is a top plan view of the table of the present invention, portions being broken away to show the table top, the plate member, and the scale platform in full lines.
Figure 2:
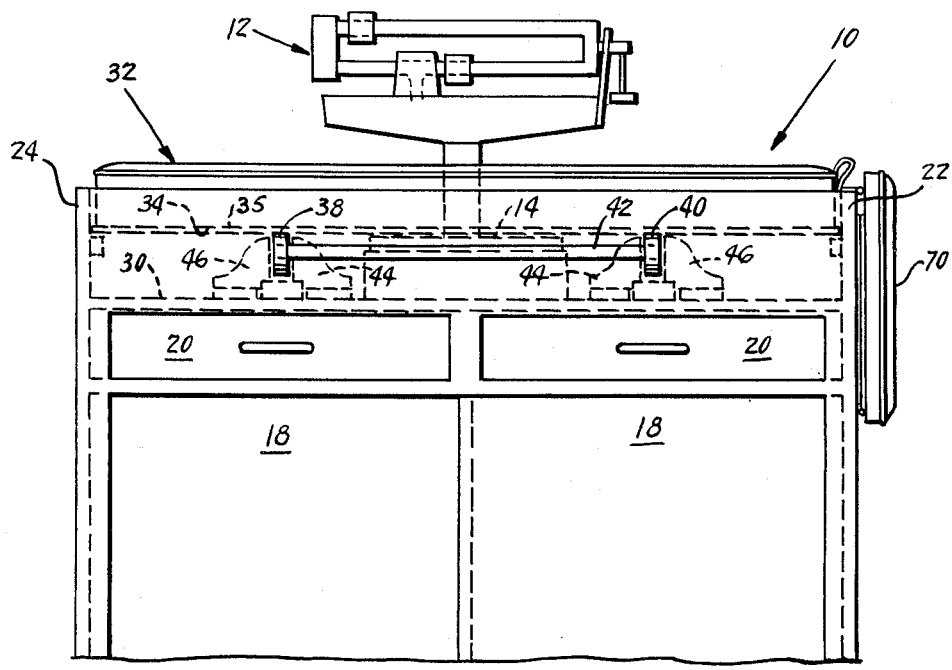
FIGURE 2 is a front elevational view with the lower portion of the table broken away.
Figure 3:
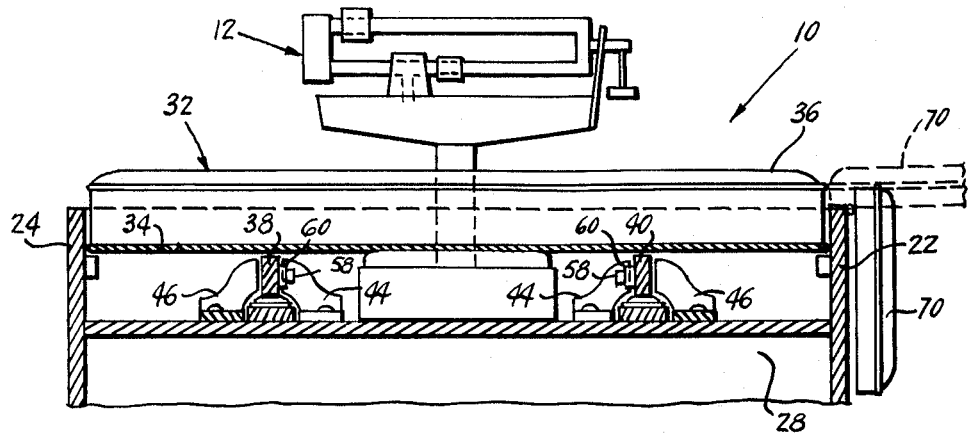
FIGURE 3 is a view taken on the line 3—3 of FIGURE 1.

Referring in detail to the drawings in which like numerals indicate like parts through the several views, the table of the present invention is indicated generally by the numeral 10 and the scale with which it is combined is indicated by the numeral 12.

The scale 12 includes a platform 14 and the table 10 includes a base member 16 having a front 18 and drawers 20. The base member 16 has side walls 22, 24, 26 and 28, rising from the base member 16.

Above the drawers 20 is a shelf 30 positioned between the side walls and below the upper ends of the side walls so as to form a recess with the base of the scale 12 resting upon the shelf 30.

Within the space defined by the walls 22, 24, 26, and 28 is a table top 32 having a rigid bottom 34 and a padded top 36. The bottom 34 rests upon a plate member 35 which normally rests upon the platform 14 of the scale 12 when the table top 32 is in the position for weighing an infant or child.

Means is provided by the present invention for shifting the plate member 35 and in turn the table top 32 resting upon it from a position in which it is used for weighing an infant or child to a solid position for examining the infant or child.

This means includes longitudinally movable horizontally disposed bars 38 and 40, each having a portion adjacent one end slidably mounted upon the shelf 30. The portion of each bar 38 and 40 adjacent the other end projects through a slot provided in the wall 26 and is exteriorly of the table 10. A bar forming a handle, as at 42 in FIGURE 1, connects the free ends of the bars 38 and 40 together.

The bars 38 and 40 are identical and will be described with reference to the bar 40 as shown most clearly in FIGURE 4.

A pair of guides 44 and 46 form a trackway for the bar 40 which is supported upon two sets of rollers 52.

Figure 4:
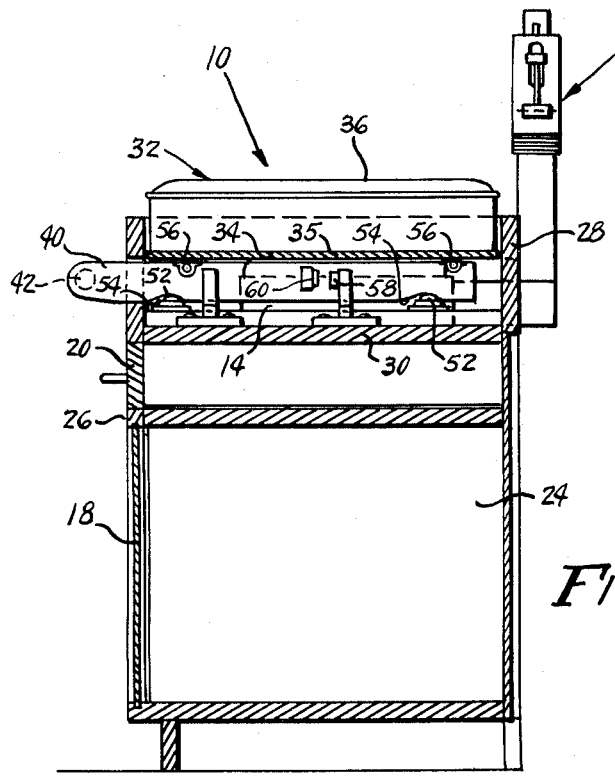
FIGURE 4 is a view taken on line 4—4 of FIGURE 1, showing the table in its entirety in end view.
Figure 5:
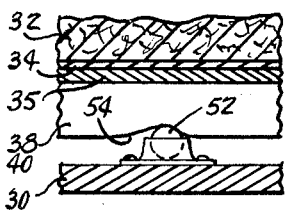
FIGURE 5 is an enlarged view of a portion of the invention shown in expanded form.

As shown most clearly in FIGURE 4, the plate member 35 rests on the top edge of the bar 40. The bar 40 has recesses receiving the rollers 52, such recesses being sloped in such a way that upon longitudinal movement of the bar 40 the plate member 35 and, in turn, the table top resting on it, will be either lifted off the scale platform 14 or lowered onto the scale platform 14.

Other rollers 56 inset into the top of the bar 40 roll against the member 35 to make the movement of the bar 40 as frictionless as possible.

In FIGURE 4 the bar 40 is in the down condition or pulled away from the back wall 28 and it will be easily seen that upon movement of the bar 40 toward the back wall 28, the bar 40 will move upwardly along with the plate member 35 which it supports and the latter along the table top 32 will thus be lifted off the scale platform 14 which shifts the table top 32 from the weighing position to the examining position.

The primary feature of the present invention resides in the provision of magnet material or magnetizable material 58 secured to the guide 44 intermediate the ends thereof and in the path of the movement of a magnet 60 secured to the side walls of bar 40, the magnet 60 engaging the magnetic material 58 upon execution of the bar 40 in the one direction toward the back wall 28 in which position the plate member 35 is out of engagement with the platform 14 of the scale 12.

It will be seen therefore that the magnet 60, with the magnetic material 58, constitutes releasable latch means for securely holding the bar 40 in the position which the table top is in condition for examination of an infant or child on the table top 32. The magnet latch retains the bar 40 against forward movement until a substantial pull is exerted on the bar 40 by means of the handle bar 42.

The retention of the bars 38 and 40 in their rearward position makes the plate member solid, and with the plate member, the table top is therefore held in a solid condition against movement under the weight and activity of an infant or child on the table top. A plate 59 interconnects the bars 38 and 40 and adds to their stability.

An extension table member 70 is hingedly connected to one end of the table 10.

While it is shown that the magnetic material 58 is on the guide 44 and the magnet 60 is on the bar 40, the two elements may be interchanged as desired.

While a single embodiment of the invention has been illustrated and described herein, other embodiments are contemplated and changes and modifications may be made therein without departing from the spirit of the invention as set forth in the appended claims.

What is claimed is:

1. An examining table comprising a base member, side and end walls rising from said base member, a shelf disposed within said side and end walls and secured thereto, a scale device including a platform, said device being supported on said shelf with said platform facing upwardly, a horizontally disposed bar having the portion adjacent one end above said shelf and mounted on said shelf for upward and downward movement and for longitudinal back and forth movement, a table top disposed within and adjacent the upper ends of said side and end walls, and a plate member resting upon said scale platform and supporting said table top, and cooperating means on said bar and on said shelf operable upon execution of movement of said bar in one direction to raise said bar and said plate member and operable to raise said table top to the examining position.

2. An examining table comprising a base member, side and end walls rising from said base member, a shelf disposed within said side and end walls and secured thereto, a scale device including a platform, said device being supported on said shelf with said platform facing upwardly, a horizontally disposed bar having the portion adjacent one end above said shelf and mounted on said shelf for upward and downward movement and for longitudinal back and forth movement, a table top disposed within and adjacent the upper ends of said side and end walls, a plate member resting upon said scale platform and supporting said table top, cooperating means on said bar and on said shelf operable upon execution of movement of said bar in one direction to raise said bar and said plate member and shift said table top from the weighing position to an examining position, and releasable latch means operable to hold said bar in said one direction movement position.

3. In an examining table including a shelf, a scale device including a platform, said device being supported upon said shelf, a plate member resting upon said platform, and movable wedge means on said shelf operable upon execution of movement in one direction to engage said plate member and lift said plate member out of resting position and upon execution of movement in the the other direction to disengage said plate member, coacting latch means carried by said wedge means and by said shelf for releasably holding said wedge means in said one direction position, and an examining table resting upon said plate member.

4. In an examining table including a shelf, a scale device including a platform, said device being supported on said shelf, a plate member normally resting upon said platform, and movable wedge means on said shelf operable upon execution of movement in one direction to lift said plate member out of resting position and upon execution of movement in the other direction to disengage said plate member, coacting magnetic latch means carried by said wedge means and by said shelf for releasably holding said wedge means in one direction position, and an examining table top resting upon said plate member.

5. An examining table comprising a base member, side and end walls rising from said base member, a shelf disposed within said side and end walls and secured thereto, a scale device including a platform, said device being supported upon said shelf with said platform facing upwardly, a horizontally disposed bar having the portion adjacent one end above said shelf and mounted on said shelf for upward and downward movement and for longitudinal back and forth movement, a plate member disposed within and adjacent the upper ends of said side and end walls and normally resting upon said scale platform, cooperating means on said bar and on said shelf operable upon execution of movement of said bar in one direction to raise said plate member and move said plate member from the normal position, releasable magnetic latch means operable to hold said bar in said one direction position, and an examining table top resting upon said plate member.

References Cited by the Examiner

UNITED STATES PATENTS

| 2,560,945 | 7/1951 | Goldberger | 177—144 X |
| 3,101,802 | 8/1963 | Kleinman | 177—144 |
| 3,127,948 | 4/1964 | Nitenson | 177—144 |
| 3,163,025 | 12/1964 | Dahlgren. | |

FOREIGN PATENTS

| 8,863/32 | 8/1933 | Australia. |

LEO SMILOW, *Primary Examiner.*